United States Patent
Pawar et al.

(10) Patent No.: US 10,645,053 B2
(45) Date of Patent: May 5, 2020

(54) GENERATING A NEW USER BASE USING ATTRACTIVE E-MAIL ADDRESSES

(71) Applicant: Microsoft Technology Licensing, LLC, Redmond, WA (US)

(72) Inventors: Dipak Sarjerao Pawar, Sammamish, WA (US); Jaskaran Singh, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 15/482,124

(22) Filed: Apr. 7, 2017

(65) Prior Publication Data
US 2018/0295086 A1    Oct. 11, 2018

(51) Int. Cl.
G06F 15/16    (2006.01)
H04L 12/58    (2006.01)

(52) U.S. Cl.
CPC .................... H04L 51/28 (2013.01)

(58) Field of Classification Search
CPC ....... H04L 51/18; H04L 67/306; H04L 67/22; H04L 51/10; H04L 51/14
See application file for complete search history.

(56) References Cited

U.S. PATENT DOCUMENTS

| | | |
|---|---|---|
| 7,917,389 B2 | 3/2011 | Mooney |
| 7,966,377 B2 | 6/2011 | Bauchot et al. |
| 9,391,929 B2 | 7/2016 | Su et al. |
| 2003/0115280 A1* | 6/2003 | Quine .................. H04L 29/1215 709/207 |
| 2004/0133561 A1 | 7/2004 | Burke |
| 2005/0165896 A1* | 7/2005 | Mooney ................. G06Q 30/02 709/206 |
| 2008/0096507 A1* | 4/2008 | Erola ...................... H04L 51/38 455/187.1 |
| 2012/0079047 A1 | 3/2012 | Sunkara et al. |
| 2012/0096019 A1 | 4/2012 | Manickam et al. |

(Continued)

OTHER PUBLICATIONS

"Email Recommendations From Wp Engine", https://wpengine.com/support/email-recommendations-from-wp-engine/, Published on: Dec. 15, 2015, 1 pages.

(Continued)

Primary Examiner — Suraj M Joshi
Assistant Examiner — Jaren Means

(57) ABSTRACT

Various embodiments of the present technology generally relate to systems and methods for attracting new users to create new e-mail accounts. More specifically, some embodiments provide for systems and methods for generating a new user base by offering attractive e-mail addresses. The attractive or preferred e-mail addresses may be shorter than the current e-mail address being used, have a particular format, belong to a particular domain, or the like. This email address can be reserved for few days and an invitation can be sent. In some embodiments, the invitation can be added at the end of an e-mail sent by another user or automatically generated from the system itself. When a recipient clicks on the link, the mailbox can be activated for use. In some embodiments, the system may offer a migration service to transfer e-mails from the original e-mail address to the new e-mail address.

20 Claims, 9 Drawing Sheets

(56) References Cited

U.S. PATENT DOCUMENTS

2013/0282840 A1* 10/2013 Agudelo ................ H04L 51/04
                                                        709/206
2015/0106690 A1   4/2015 Kamdar et al.
2015/0120691 A1   4/2015 Blemaster
2016/0241510 A1   8/2016 Kamdar et al.
2017/0006008 A1*  1/2017 Moran ............... G06Q 10/0833

OTHER PUBLICATIONS

Choudhary, Varun, "Amazing Domain Name Suggestion Tools Helpful for Your Startup Name", http://www.mashupcorner.com/amazing-domain-name-suggestion-tools/, Published on: Aug. 20, 2015, 7 pages.

* cited by examiner

GENERATING A NEW USER BASE USING ATTRACTIVE E-MAIL ADDRESSES

BACKGROUND

Computing devices such as computers, tablets, mobile phones, wearable devices and the like have become a common part of modern life. These devices enable various types of electronic communications such as text messaging, e-mail communications, video chats, and the like. These types of communications have become essential in both the personal lives and business lives of many individuals. In many cases, individuals often have multiple e-mail addresses (e.g., business e-mail address and personal e-mail address). Each e-mail address is made up of a local part and a domain (e.g., local_part@domain.com).

Many e-mail providers allow users to sign up for free and with minimal effort. During the registration process, a user often enters a desired local part for their new e-mail address. The system will check to see if that e-mail address is available. If the e-mail address isn't available, then system will often suggest alternative variations often adding extra numbers or characters. As a result, the user is often stuck with a non-preferred e-mail address.

Overall, the examples herein of some prior or related systems and their associated limitations are intended to be illustrative and not exclusive. Upon reading the following, other limitations of existing or prior systems will become apparent to those of skill in the art.

OVERVIEW

Various embodiments of the present technology generally relate to systems and methods for attracting new users to create new e-mail accounts. More specifically, some embodiments provide for systems and methods for generating a new user base by offering attractive e-mail addresses. In some embodiments, an e-mail address can be identified that has unfavorable attributes (e.g., that includes a local part with numerical values or having a length that exceeds a threshold.) An alternative e-mail address can a preferred format can be selected. For example, the alternative e-mail address may be from a domain that is unavailable without an invitation. As another example, the alternative e-mail address may include a local part without any numerical values, with just the first name or last name, with a combination of the first name and the last name, or a first initial and a last name. Then, an invitation can be sent to the e-mail address that includes a link to activate the alternative e-mail address. In some embodiments, the alternative e-mail address may be temporarily reserved for a period of time.

In some embodiments, a machine can review e-mail addresses entered by a user of an e-mail application to identify those having an unfavorable format. In some embodiments, a dialog box or user interface can be presented with the alternative e-mail address inquiring whether a sender of an e-mail would send the invitation to the recipient. When the sender responds with a willing indication, the invitation can be embedded into the e-mail from the sender. When the sender responds with an unwilling indication, the system may automatically send the invitation.

Embodiments of the present invention also include computer-readable storage media containing sets of instructions to cause one or more processors to perform the methods, variations of the methods, and other operations described herein.

Some embodiments provide for a system having one or more processors, computer readable media, and a reservation tool stored on the one or more computer readable media. The reservation tool can include program instructions which, when executed by the one or more processors, direct the one or more processors to analyze an e-mail address to a recipient entered by a user in an e-mail having a local part and a first domain. The analysis can identify e-mail address attributes (e.g., numerical values in the local part, domain, length of the local part, and the like). The reservation tool can score the e-mail address based on the e-mail address attributes identified by the analysis and identify, when the score is indicative of a non-preferred e-mail address, an alternative e-mail address having a second domain. The alternative e-mail address having the second domain can be temporarily reserved and an invitation can be sent to the recipient inviting them to register the alternative e-mail address.

In some embodiments, the invitation includes a link embedded in an e-mail from a user to a recipient. In response to the recipient clicking the link in the e-mail, the reservation tool can determine whether the temporary reservation of the alternate e-mail address has expired and present an enrollment interface when the temporary reservation of the alternate e-mail address has not expired. When the temporary reservation of the alternate e-mail address has expired, a determination can be made as to whether the alternative e-mail address is still available. A second alternative e-mail address can be identified when the alternative e-mail address is no longer available.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings in which.

Figure 1:
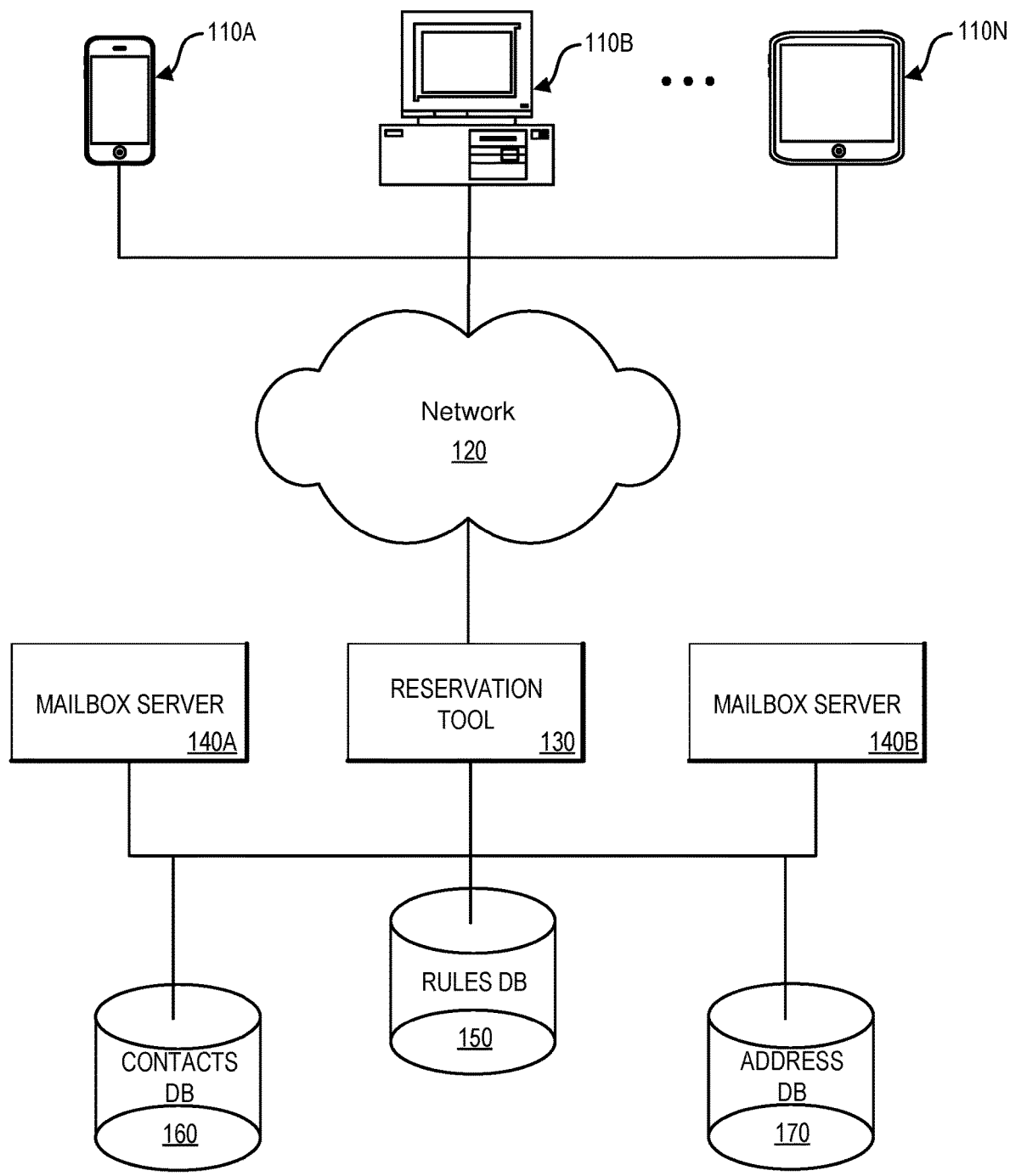
FIG. 1 illustrates an example of an environment capable of implementing a reservation tool in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems and methods for attracting new users to create new e-mail accounts. More specifically, some embodiments provide for systems and methods for generating a new user base by offering attractive e-mail addresses. In accordance with various embodiments, invitations can be sent to individuals who are using e-mail services from other providers by providing them with attractive e-mail addresses. For example, the system could send an invitation to person named "John Smith" who has an email address at a first domain "jismith1991@domain1.com" to start using "john.smith@domain2.com." By providing them an invitation to a more attractive e-mail address, the user may be more likely to switch providers.

In some embodiments, the invitation can be sent via following ways: 1) when a user sends an email to a user of another domain, the system can add invitation information in the email footer; 2) the system scan the contact list of users and send invitation emails to people who are using other email services; and 3) the system can ask users via email to send an invitation to his/her friend/contact to try out another service provider with attractive email address. The invitation can include an email address which the friend/contact is likely going to prefer over their current e-mail address (e.g. firstname.lastname@domain2.com). This email address can be reserved for few days after the invitation is sent. When the friend/contact receives this invitation, they can click on the link and the mailbox is all set for the use. In some embodiments, the system may also offer a migration service to transfer all e-mails from the original e-mail address to the new e-mail address and possibly setup forwarding.

Various embodiments of the present technology provide for a wide range of technical effects, advantages, and/or improvements to computing systems and components. For example, various embodiments include one or more of the following technical effects, advantages, and/or improvements: 1) automatic identification of non-preferred e-mail addressed (e.g., e-mail addresses with attributes that include numerical values); 2) automatic identification of alternative e-mail addresses in new domains; 3) analysis and scoring of e-mail addresses; 4) the creation of profiles of the potential new user base that can be used to rank users and/or in identifying preferred e-mail addresses; 5) creating improvements to the way e-mail applications and computing devices operate; 6) use unconventional and non-routine operations to automatically identify alternative e-mail addresses, reserve the e-mail addresses and send invitations; 7) use of additional graphical user interfaces; and/or 8) changing the manner in which a computing system reacts to the creation of an e-mail. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to creating new user base, embodiments of the present technology are equally applicable to various other applications such as, but not limited to, maintaining the current user base. For example, some embodiments, may analyze the current user base to determine which users can be offered better e-mail addresses.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 9:
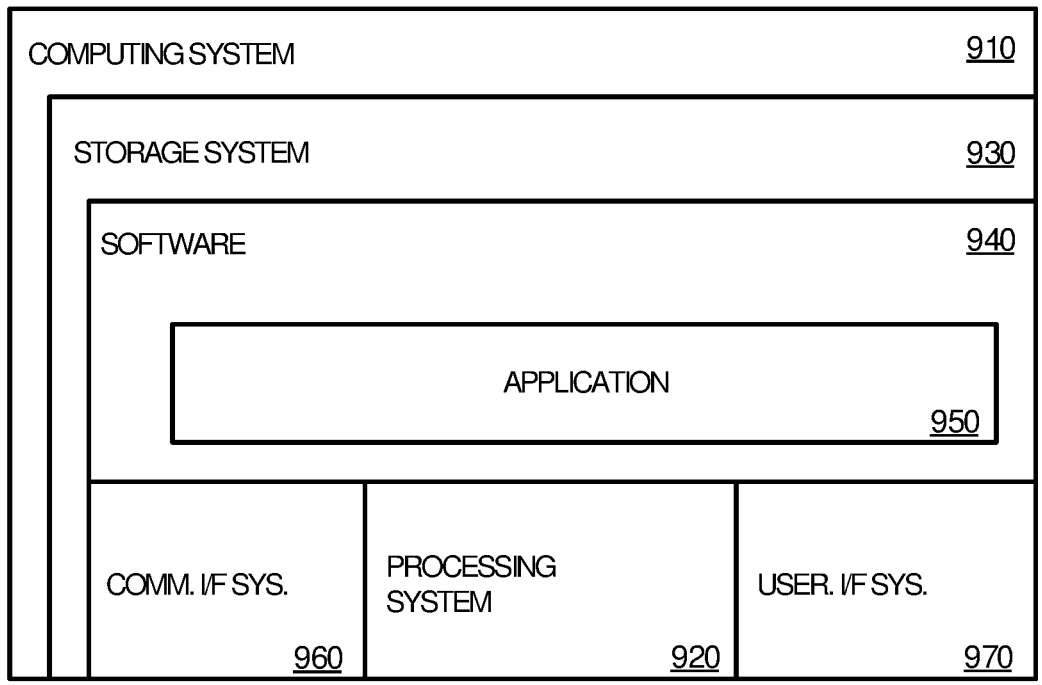
FIG. 9 illustrates an example of a computing system, which is representative of any system or collection of systems in which the various applications, services, scenarios, and processes disclosed herein may be implemented.

FIG. 1 illustrates an example of an environment 100 capable of implementing a reservation tool in accordance with some embodiments of the present technology. As illustrated in FIG. 1, environment 100 may include one or more computing devices 110A-110N, communications network 120, reservation tool 130, mailbox servers 140A-140N, and various databases such as rules database 150, contacts database 160, and address database 170. Computing devices 110A-110N can be any computing system capable of running an application natively or in the context of a web browser, streaming an application, or executing an application in any other manner Examples of computing devices 110A-110N include, but are not limited to, personal computers, mobile phones, tablet computers, mobile media device, desktop computers, laptop computers, wearable computing devices, or any other form factor, including any combination of computers or variations thereof. Computing devices 110A-110N may include various hardware and software elements in a supporting architecture suitable for providing an e-mail application that can access mailbox servers 140A-140N. One such representative architecture of a computing device is illustrated in FIG. 9 with respect to computing system 910.

Those skilled in the art will appreciate that various components (not shown) may be included in computing devices 110A-110N to enable network communication with communication network 120. In some cases, communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Reservation tool 130 can be communicably coupled to computing devices 110A-110N, mailbox servers 140A-140N, and databases 150-170. Reservation tool 130 determine when to send invitations to individuals who are using e-mail services from other providers by providing them with attractive e-mail addresses. For example, reservation tool 130 could send an invitation to person named "John Smith" who has an email address at a first domain "jismith1991@domain1.com" to start using "john.smith@domain2.com." By providing them an invitation to a more attractive e-mail address, the user may be more likely to switch providers.

Reservation tool 130 can send the invitation in a variety of ways. For example, when a user sends an email to a user of another domain, reservation tool can add invitation information to the bottom of the e-mail being sent. In some embodiments, reservation tool 130 can scan the contact list of users in contact database 160 and send invitation emails to people who are using other email services. In some embodiments, reservation tool 130 can ask users via email to send an invitation to his/her friend/contact to try out services associated with the domain of the attractive email address identified as available in address database 170. Rules database 150 sets the rules for scoring and/or ranking the e-mail addresses and alternate e-mail addresses. Using these rules, reservation tool 130 can prioritize invitations, select alternate e-mail addresses, and format invitations.

Figure 2:
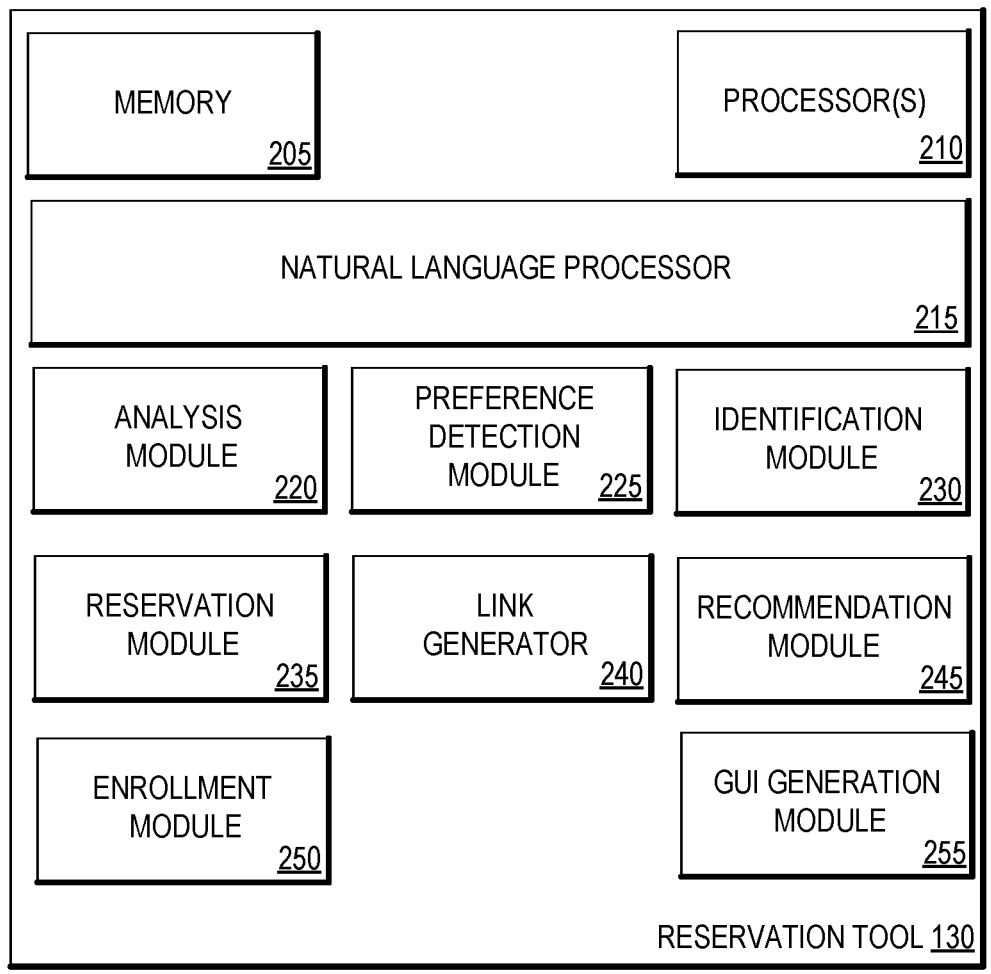
FIG. 2 illustrates an example of a set of components associated with a reservation tool that may be used in one or more embodiments of the present technology.

FIG. 2 illustrates an example of a set of components associated with a reservation tool 130 that may be used in one or more embodiments of the present technology. According to the embodiments shown in FIG. 2, reservation tool 130 can include memory 205, one or more processors 210, natural language processor 215, analysis module 220, preference detection module 225, identification module 230, reservation module 235, link generator 240, recommendation module 245, enrollment module 250, and graphical user interface (GUI) generation module 255. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, enrollment module 250 may be part of a separate system used to enroll users and create the association with the new e-mail address.

Memory 205 can be any device, mechanism, or populated data structure used for storing information. In accordance with some embodiments of the present technology, memory 205 can encompass any type of, but is not limited to, volatile memory, nonvolatile memory and dynamic memory. For example, memory 205 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of natural language processor 215, analysis module 220, preference detection module 225, identification module 230, reservation module 235, link generator 240, recommendation module 245, enrollment module 250, and/or GUI generation module 255. While not shown in FIG. 2, an operating system can provide a software package that is capable of managing the hardware resources of reservation tool 130. In some embodiments, the operating system can also provide common services for software applications running on processor(s) 210.

Natural language processor 215 can be used by analysis module 220 to analyze the contents of various e-mails. Analysis module 220 can also analyze, score, and/or rank e-mail addresses. Analysis module 220 can also build a profile of the user of the e-mail addresses. For example, analysis module can identify the first name, the last name, location information, marital status, education, family and friends, color preferences, and other information. This information may be gathered from e-mails, contact list data, or from external sources.

Preference detection module 225 can use the information from natural language processor 215 and analysis module 220 to identify various interests or preferences such as sports teams, gaming preferences, and the like. Identification module 230 can search one or more domains to identify an alternative e-mail address that the user may view more favorably. The alternative e-mail address can be based on information gathered or inferred by analysis module 220 and preference detection module 225. Reservation module 235 can temporarily reserve the alternate e-mail address. Link generator 240 can generate a link that allows the recipient to activate the e-mail address. If the recipient clicks the link after expiration, then identification module 230 can determine if the alternative e-mail address is still available. If not, then identification module 230 can attempt to identify another alternative e-mail address.

Recommendation module 245 can provide recommendations to other preferred services to the recipient. Enrollment module 250 can management the enrollment and activation process for the alternative e-mail address. GUI generation module 255 can generate one or more GUI screens that allow for interaction with a user. In at least one embodiment, GUI generation module 255 can generate a graphical user interface allowing a user to set preferences, activate an alternate e-mail address, review reports, and/or otherwise receive or convey information to the user.

Figure 3:
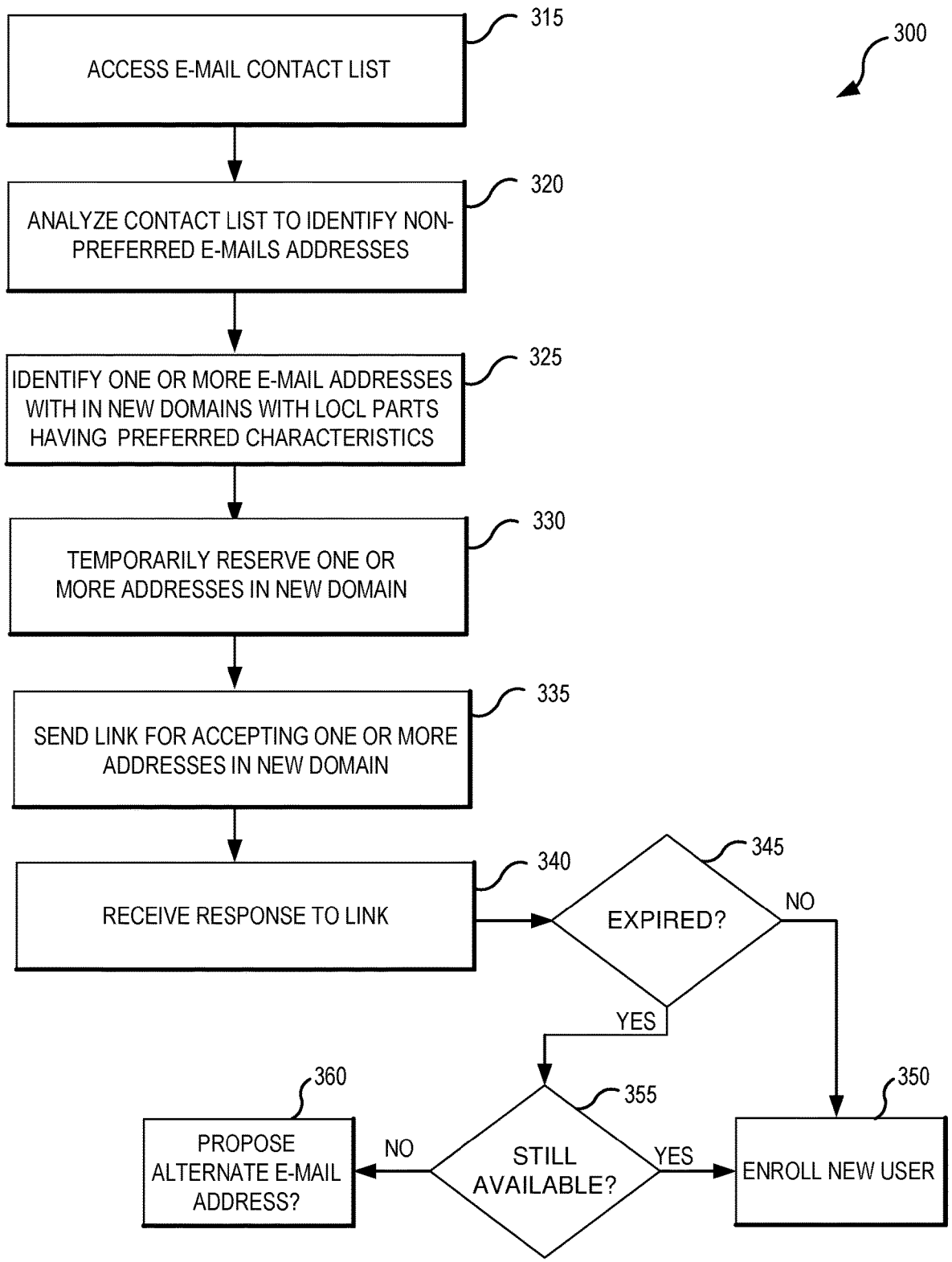
FIG. 3 illustrates an example of a set of operations for offering new e-mail addresses to new users according to one or more embodiments of the present technology.

FIG. 3 illustrates an example of a set of operations 300 for offering new e-mail addresses to new users according to one or more embodiments of the present technology. As illustrated in FIG. 3, access operation 315 accesses e-mail contact lists of willing users. Analysis operation 320 analyzes these contact lists to determine non-preferred e-mail addresses. In some cases, analysis operation may look for a variety of attributes such as, but not limited to, domain, local part over a certain length, local part with numbers, local part that is not a name, local part that is not a word, local part that is not the owners name, and the like. In some embodiments, any one of these attributes may trigger identification operation 325 to identify one or more e-mail addresses within a new domain that has a local part with preferred characteristics. In other embodiments, these attributes may be marked and then used to create a score (e.g., from a weighted average or function) so that when the score is above a threshold, identification operation 325 is triggered.

In some embodiments, analysis operation 320 may user other information about the contact that is retrieved from a variety of sources. These sources can include the contact information stored by the user, location data (e.g., city/state), third-party data sources, and external websites such LinkedIn, Facebook, and the like. The additional information collected from these places may be used in the scoring and/or as a way to identify alternate e-mail addresses that the contact may like. For example, the system may desire to collect a cross section of individuals or to concentrate individuals with certain characteristics (e.g., gender, preferences, location, etc.) so to maximize marketing and data collection activities. As such, the scoring may weight those individuals more heavily to create the desired user distribution by either eliminating those individuals or simply offering the preferred or most desirable e-mail addresses to those individuals. Consequently, the score generated by analysis operation 320 may be used as part of identification operation 325.

Once the new e-mail address has been identified, reservation operation 330 can temporarily reserve the e-mail address in the new domain. Sending operation 335 can send a link for accepting the one or more address in the new domain. Sending operation 335 may send the e-mail in a variety of ways. For example, in some embodiments, the e-mail may be automatically generated and sent under the control of the reservation. In some embodiments, sending operation 335 may ask one or more users who know the individual if they would be willing to send (or have sent from their account) the link to the one or more e-mail addresses.

Receiving operation 340 monitors for a response generated by the recipient clicking the link. Determination operation 345 determines if the reservation has expired. If determination operation 345 determines that the reservation has not expired, then determination operation 345 branches to enrollment operation 350 where the user is asked to provide identifying information, password, and other information to register. If determination operation 345 determines the reservation has expired, then determination operation 345 branches to availability operation 355 where a determination is made as to whether the e-mail address is still available. If availability operation 355 determines that the e-mail address is still available, then availability operation 355 branches to enrollment operation 350. If availability operation 355 determines that the e-mail address is no longer available, then availability operation 355 branches to proposal operation 360 where an alternate e-mail address is proposed.

Figure 4:
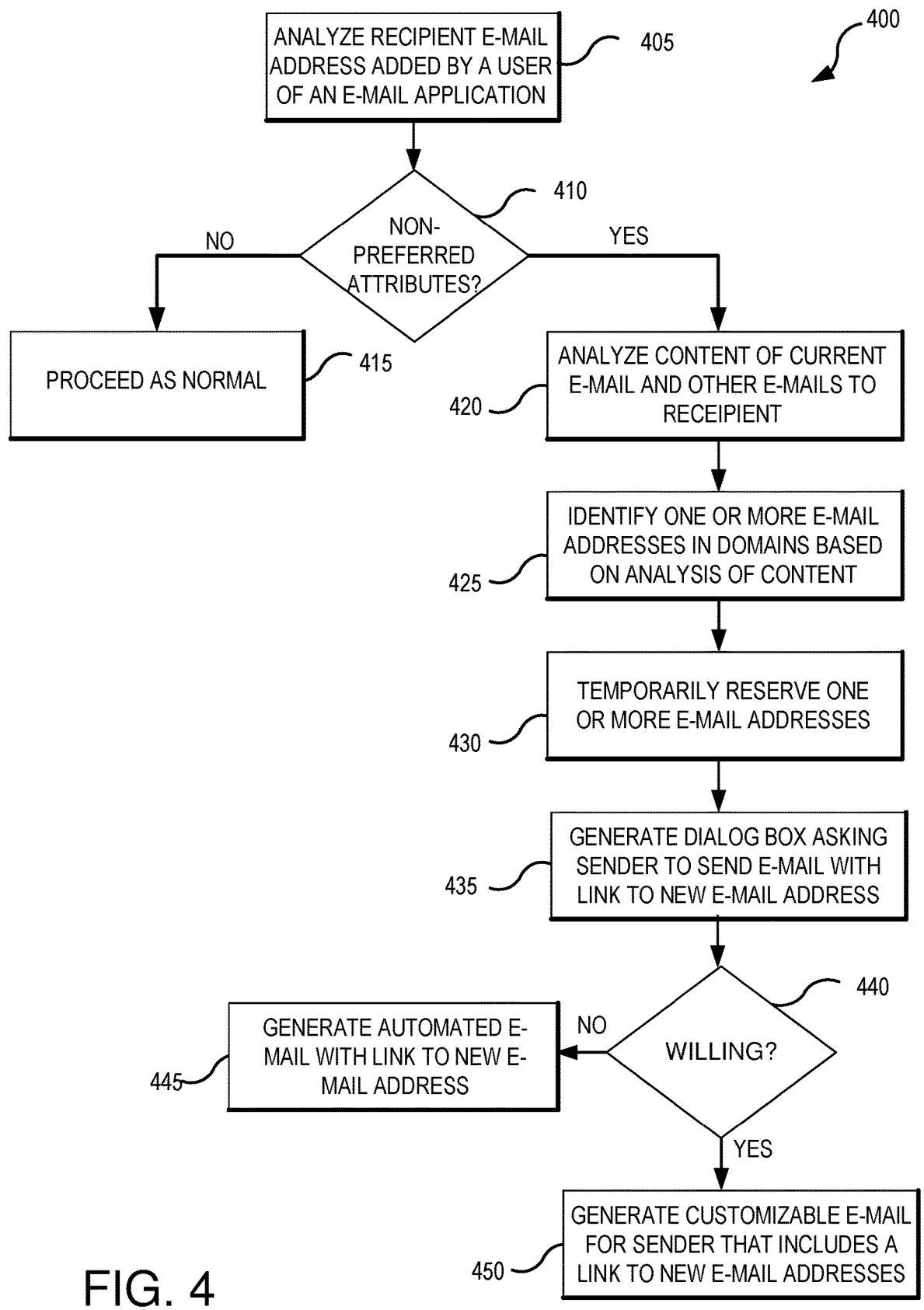
FIG. 4 illustrates an example of a set of operations that may be used to generate a new user base according to one or more embodiments of the present technology.

FIG. 4 illustrates an example of a set of operations 400 that may be used to generate a new user base according to one or more embodiments of the present technology. As illustrated in FIG. 4, analysis operation 405 can analyze e-mail addresses of recipients of an e-mail. Analysis operation 405 can score the e-mail address based on a variety of factors of the e-mail domain name and local part. For example, the score may be based on the local part exceeding a threshold number of characters, having numeric characters, not being a name, and the like. Determination operation 410 uses the results of analysis operation 405 to determine whether the recipient e-mail address includes non-preferred attributes. If the non-preferred attributes do not warrant suggestion of a new e-mail (e.g., they are already a member of the available or affiliate domain), then determination operation 410 branches to proceed operation 415 where the e-mail application proceeds as normal to send the e-mail to the recipient address.

If determination operation 410 determines that the recipient e-mail address contains non-preferred attributes and a new e-mail address should be suggested, then determination operation 410 branches to preference operation 420 that analyzes the content of the current e-mail and possibly other e-mails sent to that recipient address. Preference operation 420 can rank available domains based on the content of the e-mails. For example, if the content of the e-mails is mostly business related certain domains may be ranked lower. Once the domains have been ranked, identification operation 425 can identify one or more e-mail address in one or more domains based on the analysis of the e-mail content. Reservation operation temporarily reserves the one or more e-mail addresses.

Dialog operation 435 generates a dialog box (see, e.g., FIG. 5) asking the sender to send an email to the recipient that includes the links to the new e-mail addresses. Agreement operation 440 monitors for a response from the sender. If agreement operation 440 receives a response that is indicative of the sender being not willing to send the links, then agreement operation 440 branches to automation operation 445 that generates and sends an automated e-mail with the links to the new e-mail addresses. If agreement operation 440 receives a response that is indicative of the sender being willing to send the links, then agreement operation 440 branches to customization operation 450 that generates a customizable e-mail for the sender to send to the recipient that includes the links to the new e-mail addresses that have been reserved.

Figure 5:
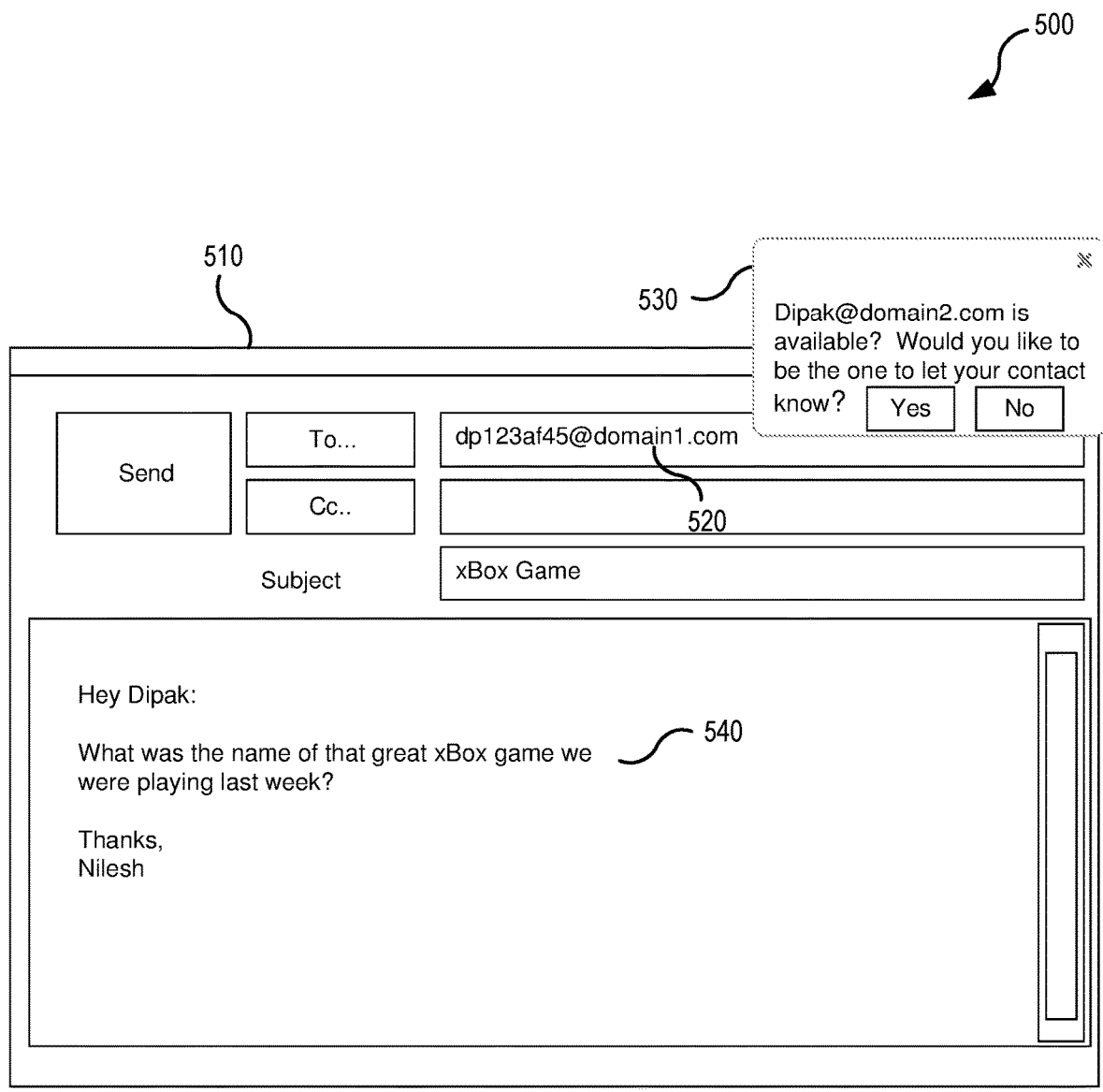
FIG. 5 illustrates an example of a user interface that may be used in accordance with some embodiments of the present technology.

FIG. 5 illustrates an example of a user interface that may be used in accordance with some embodiments of the present technology. As illustrated in FIG. 5, a user is preparing e-mail 510 to a recipient. In the "To" field, the user types at e-mail address 520 as dp123af45@domain1.com. The application can review the e-mail address (or send the address to reservation tool 130) to determine if the e-mail address is in an unaffiliated domain and/or has non-preferred attributes. As illustrated in FIG. 5, the local part of the e-mail address includes non-preferred attributes (e.g., numerical values). As such, the system will search for alternative e-mail addresses in a new domain and present dialog box 530 to the user. In some embodiments, the search may be based on the content 540 of the e-mail. In some cases, a profile of the recipient may be built over time from the content of multiple e-mails and/or information from external sources.

Dialog box 530 can present the found e-mail address and ask the user if they would like to be the one to notify the recipient of the availability of that new address. If the user selects yes, they may be prompted as to whether the user would like the notification embedded in the current e-mail or sent via a separate e-mail. If the user selects no, then an automated e-mail may be sent. In some embodiments, the user may be presented multiple e-mail addresses and asked as to which one the recipient may prefer. Similarly, the user may be asked a few questions about the recipient. Based on the feedback from the user, a more desirable e-mail address may be selected.

Figure 6:
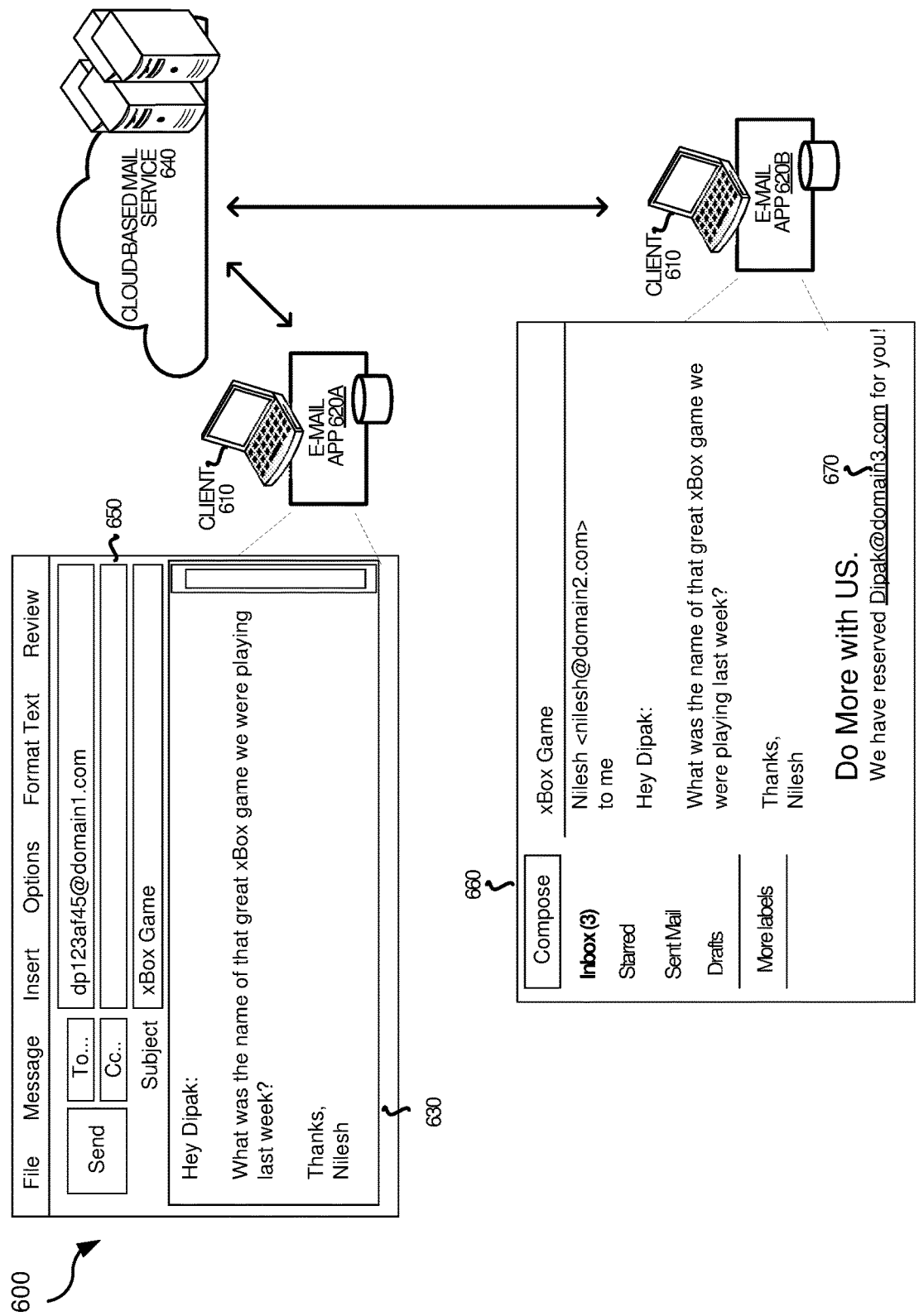
FIG. 6 illustrates an example of how a cloud-based mail service may be used in accordance with various embodiments of the present technology.

FIG. 6 illustrates an example of how a cloud-based mail service may be used in accordance with various embodiments of the present technology. As illustrated in FIG. 6, client device 610 runs e-mail application 620A that can be used to create e-mail 630 e-mail service 640. The e-mail service 640 is representative of any service providing shared access to cloud-based or centralized e-mail systems. In the embodiments shown in FIG. 6, e-mail 630 can be created on client device 610 with e-mail application 620A. E-mail application 620A can include functionality including GUIs (graphical user interface) running on client device 610, e.g., a PC, mobile phone device, a Web server, or other application servers. Such systems may employ one or more virtual machines, containers, or any other type of virtual computing resource.

Figure 7:
FIG. 7 illustrates an example of a user registration interface that may be used in one or more embodiments of the present technology.

The system can analyze the recipient's e-mail address 650. If certain attributes are present, then the system may can temporarily reserve (e.g., for 1 day, 5 days, 1 week, etc.) one or more new e-mail addresses. The system can generate a link which is embedded into the e-mail so that when the recipient opens e-mail 660 using e-mail application 620B, they have access to link 670. When the user selects the link, they may be routed to an enrollment interface. FIG. 7 illustrates an example of a user registration interface that may be used in one or more embodiments of the present technology.

Figure 8:
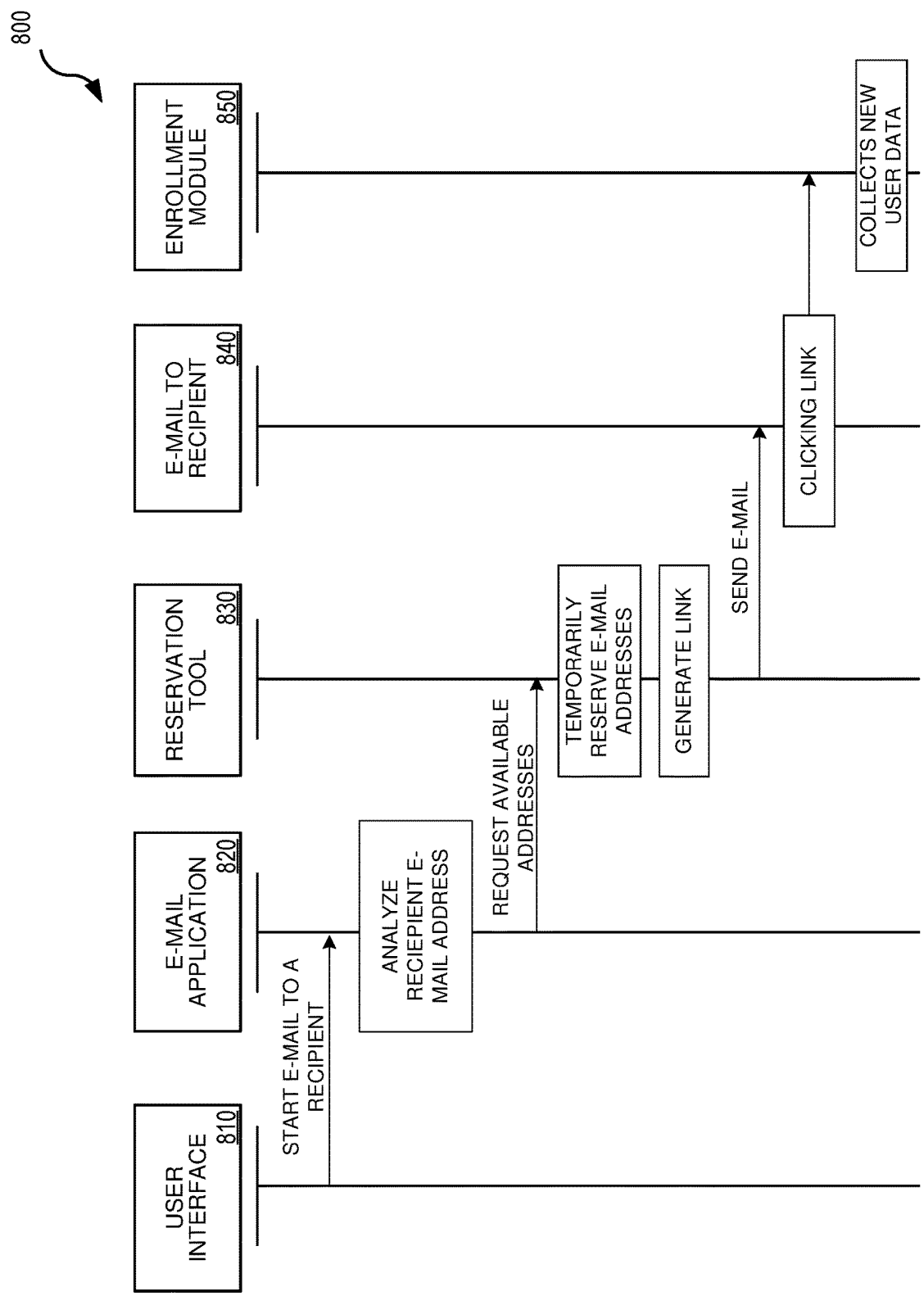
FIG. 8 is a sequence diagram illustrating an example of data flow between various components that may be used in some embodiments of the present technology.

FIG. 8 is a sequence diagram 800 illustrating an example of data flow between various components that may be used in some embodiments of the present technology. As illustrated in FIG. 8, a user can use user interface 810 to start an e-mail to a recipient using e-mail application 820. After the user has entered the e-mail address, e-mail application can pass the e-mail address to reservation tool 830 or analyze the e-mail to determine if the e-mail address meets criteria for possibly offering a new e-mail address. When e-mail application (or reservation tool 830) determines that the criteria has been met, then reservation tool 830 can reserve one or more e-mail addresses that may have a more favorable form (e.g., with a local part of just a first name, just a last name, first.last name, first name initial followed by the last name, or other format). Reservation tool 830 can then generate one or more links that allows the e-mail address to be redeemed.

In the embodiments illustrated in FIG. 8, reservation tool 830 can send an e-mail to e-mail recipient 840 that includes the one or more links to access the reserved e-mail addresses. In other embodiments, not shown in FIG. 8, reservation tool 830 may pass the links back to e-mail application 820 where they can be included in the e-mail from the user or sent in a separate e-mail. Once the recipient receives the e-mail, they can click on a link to an access the e-mail. For example, the link may be a URL that directs a web browser to a specific location that accesses enrollment module 850. Enrollment module 850 can collect user data and setup the new e-mail account that was reserved by reservation tool 830. If a user does not click the link (e.g., within a set amount of time such as one week), the reservation created by reservation tool can expire and the address may be offered to other individuals.

FIG. 9 illustrates computing system 910, which is representative of any system or collection of systems in which the various applications, services, scenarios, and processes disclosed herein may be implemented. For example, computing system 910 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 910 may be implemented as a single apparatus, system, or device or may be implemented in a distributed manner as multiple apparatuses, systems, or devices. Computing system 910 includes, but is not limited to, processing system 920, storage system 930, software 940, application 950, communication interface system 960, and user interface system 970. Processing system 920 is operatively coupled with storage system 930, communication interface system 960, and an optional user interface system 970.

Processing system 920 loads and executes software 940 from storage system 930. When executed by processing system 920 for deployment of scope-based certificates in multi-tenant cloud-based content and collaboration environments, software 940 directs processing system 920 to operate as described herein for at least the various processes, operational scenarios, and sequences discussed in the foregoing implementations. Computing system 910 may optionally include additional devices, features, or functionality not discussed for purposes of brevity.

Referring still to FIG. 9, processing system 920 may comprise a micro-processor and other circuitry that retrieves and executes software 940 from storage system 930. Processing system 920 may be implemented within a single processing device, but may also be distributed across multiple processing devices or sub-systems that cooperate in executing program instructions. Examples of processing system 920 include general purpose central processing units, application specific processors, and logic devices, as well as any other type of processing device, combinations, or variations thereof.

Storage system 930 may comprise any computer readable storage media readable by processing system 920 and capable of storing software 940. Storage system 930 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 930 may also include computer readable communication media over which at least some of software 940 may be communicated internally or externally. Storage system 930 may be implemented as a single storage device, but may also be implemented across multiple storage devices or sub-systems co-located or distributed relative to each other. Storage system 930 may comprise additional elements, such as a controller, capable of communicating with processing system 920 or possibly other systems.

Software 940 may be implemented in program instructions and among other functions may, when executed by processing system 920, direct processing system 920 to operate as described with respect to the various operational scenarios, sequences, and processes illustrated herein. For example, software 940 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 940 may include additional processes, programs, or components, such as operating system software, virtual machine software, or application software. Software 940 may also comprise firmware or some other form of machine-readable processing instructions executable by processing system 920.

In general, software 940 may, when loaded into processing system 920 and executed, transform a suitable apparatus, system, or device (of which computing system 910 is representative) overall from a general-purpose computing system into a special-purpose computing system. Indeed, encoding software on storage system 930 may transform the physical structure of storage system 930. The specific transformation of the physical structure may depend on various factors in different implementations of this description. Examples of such factors may include, but are not limited to, the technology used to implement the storage media of storage system 930 and whether the computer-storage media are characterized as primary or secondary storage, as well as other factors.

For example, if the computer readable storage media are implemented as semiconductor-based memory, software 940 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 960 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 970 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 970. In some cases, the input and output devices may be combined in a single device, such as a display capable of displaying images and receiving touch gestures. The aforementioned user input and output devices are well known in the art and need not be discussed at length here. In some cases, the user interface system 970 may be omitted when the computing system 910 is implemented as one or more server computers such as, for example, blade servers, rack servers, or any other type of computing server system (or collection thereof).

User interface system 970 may also include associated user interface software executable by processing system 920 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 910 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system comprising:
one or more processors;
one or more computer readable media; and
a reservation tool stored on the one or more computer readable media, the reservation tool including program instructions which, when executed by the one or more processors, direct the one or more processors to:
analyze an e-mail address to a recipient entered by a user in an e-mail;
wherein the e-mail address has a local part and a first domain; and
wherein the analysis of the e-mail address to the recipient identifies e-mail address attributes;
score the e-mail address based on the e-mail address attributes identified by the analysis;
identify, when the score is indicative of a non-preferred e-mail address, an alternative e-mail address having a second domain,
wherein the alternative e-mail address is shorter, has a particular format, or belongs to a particular domain;
temporarily reserve the alternative e-mail address having the second domain; and
send an invitation to the recipient inviting them to register the alternative e-mail address.

2. The system of claim 1, wherein the invitation includes a link embedded in an e-mail from the user to a recipient.

3. The system of claim 2, wherein in response to the recipient clicking the link in the e-mail, the instructions when executed by the one or more processors further:
determine whether the temporary reservation of the alternate e-mail address has expired;
present an enrollment interface when the temporary reservation of the alternate e-mail address has not expired; and
determine, when the temporary reservation of the alternate e-mail address has expired, whether the alternative e-mail address is still available.

4. The system of claim 3, wherein the instructions when executed by the one or more processors further determine a second alternative e-mail address when the alternative e-mail address is no longer available.

5. The system of claim 1, the instructions when executed by the one or more processors further:
analyze a body of the e-mail to the recipient to identify interests of the user; and
select the second domain, at least in part, based on the analysis of the body of the e-mail.

6. A memory storage device having instructions stored thereon instructions that when executed by one or more processors cause a machine to:
identify an e-mail address that includes a local part with numerical values or having a length that exceeds a threshold;
select an alternative e-mail address having a preferred format that is shorter, has a particular format, or belongs to a particular domain; and
send an invitation to the e-mail address that includes a link to activate the alternative e-mail address.

7. The memory storage device of claim 6, wherein to identify the e-mail address the machine reviews e-mail addresses entered by a user of an e-mail application.

8. The memory storage device of claim 6, wherein to the alternative e-mail address is selected, at least in part, using a name of a user of the e-mail address.

9. The memory storage device of claim 6, wherein the instructions when executed by the one or more processors cause the machine to:
present a user interface with the alternative e-mail address inquiring whether a sender of an e-mail would send the invitation to a recipient;
embedding the invitation into the e-mail when the sender responds with a willing indication; and
automatically sending the invitation when the sender responds with an unwilling indication.

10. The memory storage device of claim 6, wherein the alternative e-mail address is from a domain that is unavailable without an invitation.

11. The memory storage device of claim 6, wherein the preferred format includes a local part without any numerical values, with just a first name or a last name, with a combination of the first name and the last name, or a first initial and a last name.

12. The memory storage device of claim 6, wherein the instructions when executed by the one or more processor cause the machine to build a profile around a user of the e-mail address that is based on an analysis of e-mail content from e-mails sent to the e-mail address and external website data.

13. The memory storage device of claim 6, wherein the instructions when executed by the one or more processors cause the machine to poll users of an e-mail service to gather information about a user of the e-mail address.

14. A method comprising:
analyzing contact lists stored in a database for one or more users of an e-mail service hosting a first domain;
wherein the contact lists each include multiple e-mail addresses;
wherein each of the multiple e-mail addresses has a local part and a domain; and
identifying an alternative e-mail address for a first e-mail address in the contact lists,
wherein the alternative e-mail address is shorter, has a particular format, or belongs to a particular domain;
sending, to the first e-mail address, an invitation that includes a link to register the alternative e-mail address.

15. The method of claim 14, wherein the domain is a first domain and the alternative e-mail address includes a second domain.

16. The method of claim 15, further comprising:
analyzing a body of an e-mail to a recipient having the first e-mail address; and
selecting the second domain, at least in part, based on the analysis of the body of the e-mail.

17. The method of claim 14, further comprising:
scoring each e-mail address in the contact lists; and
prioritizing, based on the scoring, finding alternative e-mail addresses for the e-mail addresses in the contact lists.

18. The method of claim 14, further comprising:
temporarily reserving the alternative e-mail address for a period of time;
receiving a response to the invitation;
determining whether the invitation has expired; and identifying a second alternative e-mail address when the invitation has expired.

19. The method of claim 14, wherein analyzing contact lists stored in a database includes scoring one or more e-mail address based on based on one or more of the following factors: the local part exceeding a threshold number of characters, the local part having one or more numeric characters, the local part not being a word, or the local part not being a name.

20. The method of claim 14, further comprising:
collect, from information in the contact lists, websites, or third-party data sources, characteristics of users associated with the multiple e-mail addresses,
    wherein the characteristics include gender, preferences, or location;
ranking the multiple e-mail addresses using the characteristics to maximize marketing and data collection activities; and
identifying a second alternative e-mail address based on the ranking.

* * * * *